(12) United States Patent
Woo

(10) Patent No.: US 7,382,724 B1
(45) Date of Patent: Jun. 3, 2008

(54) AUTOMATIC SWITCHOVER MECHANISM IN A NETWORK DEVICE

(75) Inventor: Hsien-Chung Woo, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 911 days.

(21) Appl. No.: 09/990,077

(22) Filed: Nov. 21, 2001

(51) Int. Cl.
*H04L 1/00* (2006.01)
*H04L 12/26* (2006.01)
*H04L 12/28* (2006.01)

(52) U.S. Cl. ............... 370/230; 370/219; 370/220; 370/228; 370/235

(58) Field of Classification Search ......... 370/216–222, 370/225, 228, 230, 235
See application file for complete search history.

(56) References Cited

U.S. PATENT DOCUMENTS

| | | | | |
|---|---|---|---|---|
| 4,551,836 A * | 11/1985 | Parikh | ................... | 714/700 |
| 5,301,184 A * | 4/1994 | Uriu et al. | ................... | 370/219 |
| 5,663,949 A * | 9/1997 | Ishibashi et al. | ............ | 370/220 |
| 6,002,687 A * | 12/1999 | Magee et al. | ............... | 370/394 |
| 6,031,838 A * | 2/2000 | Okabe et al. | ............... | 370/395.6 |
| 6,262,973 B1 * | 7/2001 | Shiraishi et al. | ............. | 370/228 |
| 6,434,532 B2 * | 8/2002 | Goldband et al. | .............. | 705/7 |
| 6,496,481 B1 * | 12/2002 | Wu et al. | ................... | 370/242 |
| 6,700,868 B2 * | 3/2004 | Smith et al. | ................. | 370/217 |
| 6,765,907 B1 * | 7/2004 | Xu et al. | ..................... | 370/390 |
| 6,778,536 B1 * | 8/2004 | Ofek et al. | ............... | 370/395.4 |
| 6,822,958 B1 * | 11/2004 | Branth et al. | ............... | 370/390 |
| 6,865,689 B1 * | 3/2005 | Gibson et al. | ................. | 714/8 |
| 6,868,082 B1 * | 3/2005 | Allen et al. | ................. | 370/360 |
| 6,956,816 B1 * | 10/2005 | Alexander et al. | .......... | 370/222 |
| 6,963,926 B1 * | 11/2005 | Robinson | ................... | 709/239 |
| 7,187,649 B1 * | 3/2007 | Mazzurco et al. | .......... | 370/228 |
| 7,197,052 B1 * | 3/2007 | Crocker | ...................... | 370/474 |
| 2002/0024928 A1 * | 2/2002 | Furuichi | .................... | 370/218 |

FOREIGN PATENT DOCUMENTS

WO      WO /9859464      * 12/1998

* cited by examiner

*Primary Examiner*—Ronald Abelson
(74) *Attorney, Agent, or Firm*—Harrity Snyder, LLP

(57) ABSTRACT

A system comprises a plurality of processing modules, one of which is designated to be the primary processing module and the others are designated to be secondary processing modules. During operation, state is maintained in the primary processing module and at least one of the secondary processing modules. A switchover controller causes outputs from the secondary modules to be discarded. When the switchover controller receives an indication that the primary processing module has failed, it designates one of the secondary processing modules to be the primary processing module. Because the newly designated primary processing module already has current state information at switchover, the module is able to operate with minimal delay.

21 Claims, 6 Drawing Sheets

AUTOMATIC SWITCHOVER MECHANISM IN A NETWORK DEVICE

BACKGROUND OF THE INVENTION

In a conventional computer network (e.g., a local area network or wide area network), computers communicate over a network infrastructure made up of interconnected nodes, such as routers and/or switches, connected by communication links such as optical fiber, copper cable, and wireless links. Often, the topology is such that each node connects to multiple neighboring nodes (e.g., as in a mesh configuration).

Typically, data propagates through such a network in discrete units referred herein as "packets" (meaning any fixed- or variable-sized discrete unit of data, including frames, cells, segments, or packets). For each received packet, a node examines the contents of the packet (e.g., a destination address in the packet header) and determines which neighboring node to forward the packet to. Often, a node makes this determination by performing a table lookup. The neighboring node performs a similar determination until the packet eventually propagates from node to node through the network to its destination.

When a node (or a component in the node) fails, the node may no longer be operative to forward packets. Such a failure may result in serious disruption to the performance of the network. Even after the failure is repaired, there may be a delay before the node becomes fully operational, resulting in continued disruption to the network. In routers, for example, the operation of certain components may depend upon state information, which is maintained in the router according to the contents of previously forwarded packets. Accordingly, once the failure in the router is finally repaired, it may take some amount of time for the router to generate sufficient state information for it to function properly.

Thus, there is a need for an invention that more adequately addresses such problems which may occur in the network.

SUMMARY OF THE INVENTION

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

In accordance with the principles of the invention, a system comprises a plurality of processing modules, one of which is designated to be the primary processing module and the others are designated to be secondary processing modules. During operation, state is maintained in the primary processing module and at least one of the secondary processing modules. A switchover controller causes outputs from the secondary modules to be discarded. When the switchover controller receives an indication that the primary processing module has failed, it designates one of the secondary processing modules to be the primary processing module. Because the newly designated primary processing module already has current state information at switchover, the module is able to operate with minimal delay.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one (several) embodiment(s) of the invention and together with the description, serve to explain the principles of the invention.

DESCRIPTION OF THE PREFERRED EMBODIMENTS

According to the invention, a system comprises a plurality of processing modules, one of which is designated to be the primary processing module and the others are designated to be secondary processing modules. During operation, state information is maintained in the primary processing module and at least one of the secondary processing modules. The processing modules may obtain the state information from a received data stream (e.g., information contained in packet headers) or received control information (e.g. routing engine configuration information or control traffic). A switchover controller causes outputs from the secondary modules to be discarded. When the switchover controller receives an indication that the primary processing module has failed, it designates one of the secondary processing modules to be the primary processing module. Because the newly designated primary processing module already has current state information at switchover, the module is able to operate with minimal delay. The invention is described herein in connection with a network switching device, but may be usable in other types of devices that use modules in which state information is maintained.

Figure 1:
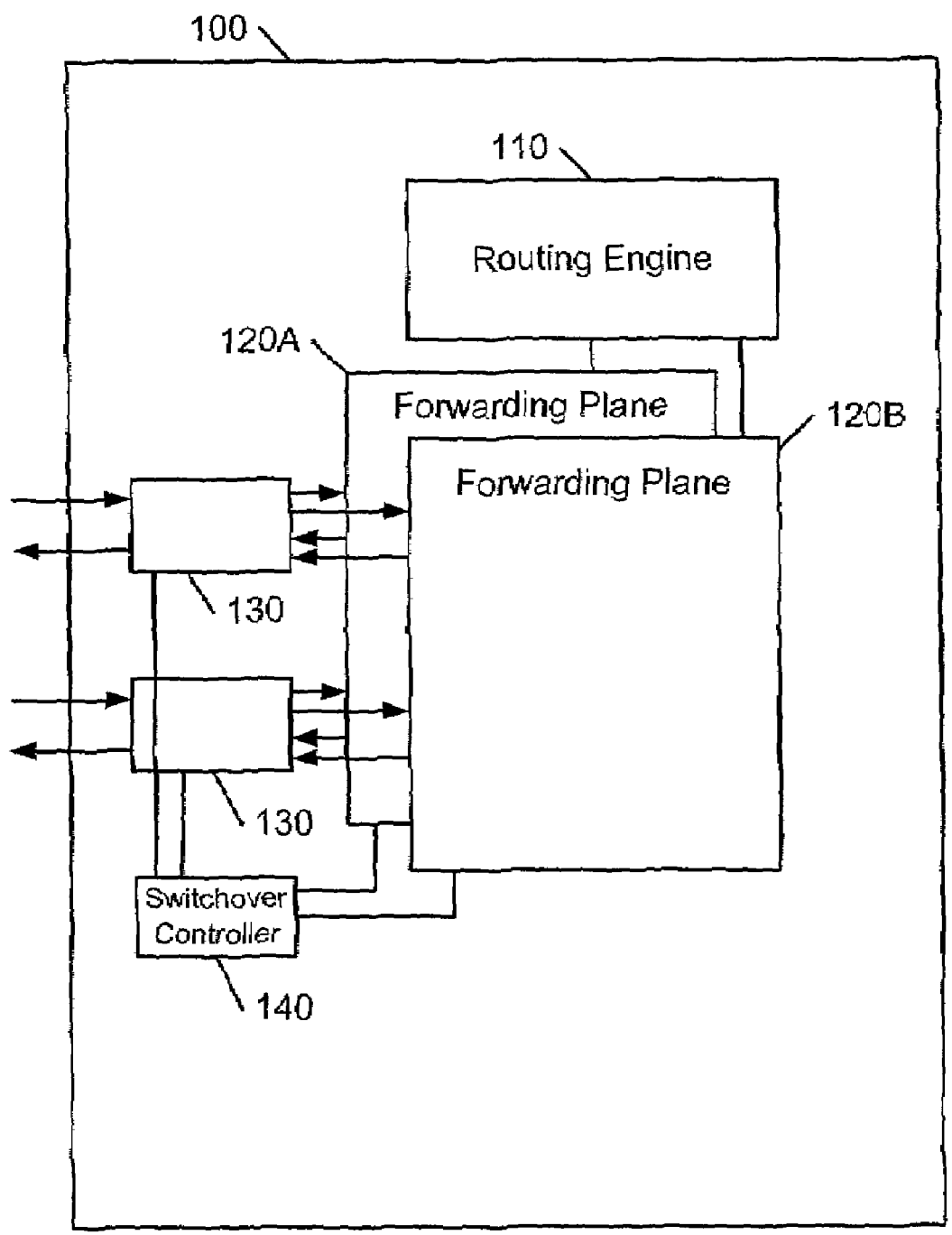
FIG. 1 is a block diagram of a first system incorporating principles of the invention.

FIG. 1 shows system 100 which incorporates principles of the invention. As shown in FIG. 1, system 100 includes routing engine 110, forwarding planes 120A and 120B, interface modules 130, and switchover controller 140. Routing engine 110 is coupled to both forwarding planes 120A and 120B. Each interface module 130 is coupled to both forwarding planes 120A and 120B. Switchover controller 140 is coupled to forwarding planes 120A and 120B and each of the interfaces 130. System 100 is preferably a network switching device (e.g., a router or switch), which interconnects with other switching devices to form part of a network, and accordingly may include other components used in a network switching device.

Routing engine 110 is responsible for generating routing and/or forwarding tables based on information it systematically receives about the network in which system 100 is connected. Such information is typically received using conventional routing protocols. After routing engine 110 generates a forwarding table, it transmits the forwarding to each of the forwarding planes 120A and 120B for use in forwarding packets. In a preferred embodiment, routing engine 110 is implemented as a processor executing software modules.

Forwarding planes 120A and 120B handle packet forwarding. Each forwarding plane includes a plurality of inputs at which data packets are received and a plurality of outputs from which data packets are transmitted. In one embodiment, each forwarding plane is a packet forwarding engine, configured to analyze destination information contained in the headers of received packets and, using a forwarding table, determine appropriate outputs for transmitting the received packets. In another embodiment, each forwarding plane is a TDM (time division multiplexed) plane, configured to analyze destination information contained in received packets and transmit the received packets onto channels at outputs based on appropriate time slots. Forwarding planes 120A and 120B can be implemented in hardware using ASICs or other circuit technology, or in software executing modules to perform the appropriate functionality, or in a combination of hardware and software. The determination of the appropriate outputs for respective packets is preferably carried out using a processor configured to perform table lookups. While two forwarding planes are shown in FIG. 1, more than two forwarding planes could also be used. In accordance with one embodiment of the invention, both forwarding planes receive and process the same packets from interface modules 130 (so that they can both maintain the same state information), though only packets forwarded by the primary forwarding plane are output by interface modules 130.

Interface modules 130 connect to respective external lines and forwarding planes 120A and 120B to transmit packets between the external lines and forwarding planes 120A and 120B. In receiving packets from the external lines, interface modules 130 preferably perform some processing on the received packets (e.g., layer 2/3 header processing) and then transmit the packets to forwarding planes 120A and/or 120B. In transmitting packets out on the external lines, interface modules 130 preferably perform some processing from packets received from forwarding planes 120A and/or 120B and then transmit the packets to the respective lines. In a preferred embodiment, interface modules 130 are equipped to handle characteristics unique to the external lines to which they are connected. For example, if the external lines are fiber optic, interface modules 130 may incorporate optical components, such as lasers, to receive and transmit packets over the fiber optic lines. While two interface modules 130 are shown, fewer or more interface modules 130 may be used. In addition, while each interface module 130 is shown as having a single incoming line and a single outgoing line, interface modules 130 could have more incoming and outgoing lines.

Figure 2A:
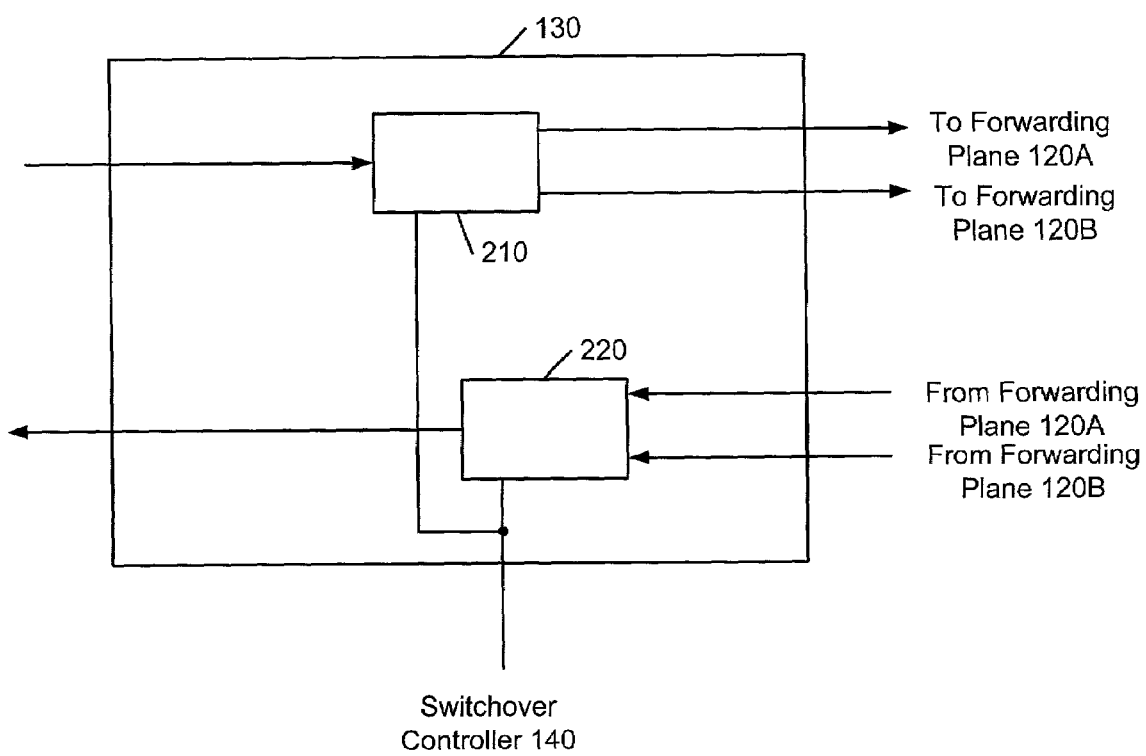
FIGS. 2A and 2B are block diagrams of interface modules usable in the system shown in FIG. 1.
Figure 2B:
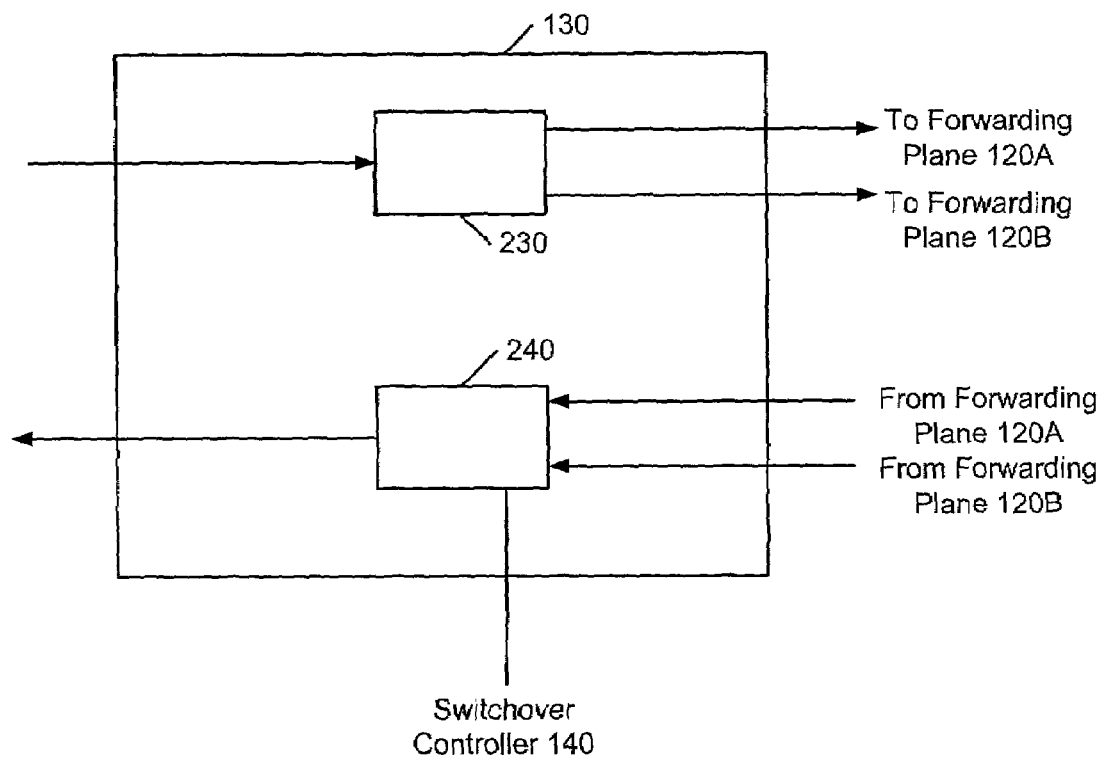

FIGS. 2A and 2B show different embodiments of interface module 130. In FIG. 2A, interface module 130 includes spray logic 210 and despray logic 220. Spray logic 210 receives packets at an incoming line and, under the control of a signal from the switchover controller, outputs the received packets to either forwarding plane 120A or forwarding plane 120B. Despray logic 220 receives packets from both forwarding plane 120A and forwarding plane 120B and, under the control of a signal from the switchover controller, outputs the received packets from one of the forwarding planes to an outgoing line. In one embodiment, spray logic 210 could be implemented as a demultiplexor and despray logic 220 could be implemented as a multiplexor.

FIG. 2B shows another embodiment of interface module 130. As shown in FIG. 2B, interface module 130 includes duplicator logic 230 and despray logic 240. Duplicator logic 230 differs from spray logic 210 in that duplicator logic 230 duplicates received packets for transmission to both forwarding planes 120A and 120B, while spray logic 210 transmits received packets to only one of the forwarding planes. Because duplicator logic 230 transmits received packets to both forwarding planes, it is shown as not receiving a signal from switchover controller 140. In embodiments where interface module 130 connects to more than two forwarding planes, duplicator logic 230 could receive a signal from switchover controller 140 to transmit received packets to both a primary forwarding plane and a single secondary forwarding plane. Despray logic 240 is substantially similar to despray logic 220.

Referring back to FIG. 1, switchover controller 140 controls the manner in which interface modules 130 interact with forwarding planes 120A and 120B based on the status of the forwarding planes. Switchover controller 140 may be implemented in hardware, software, or a combination of hardware and software.

Figure 3:
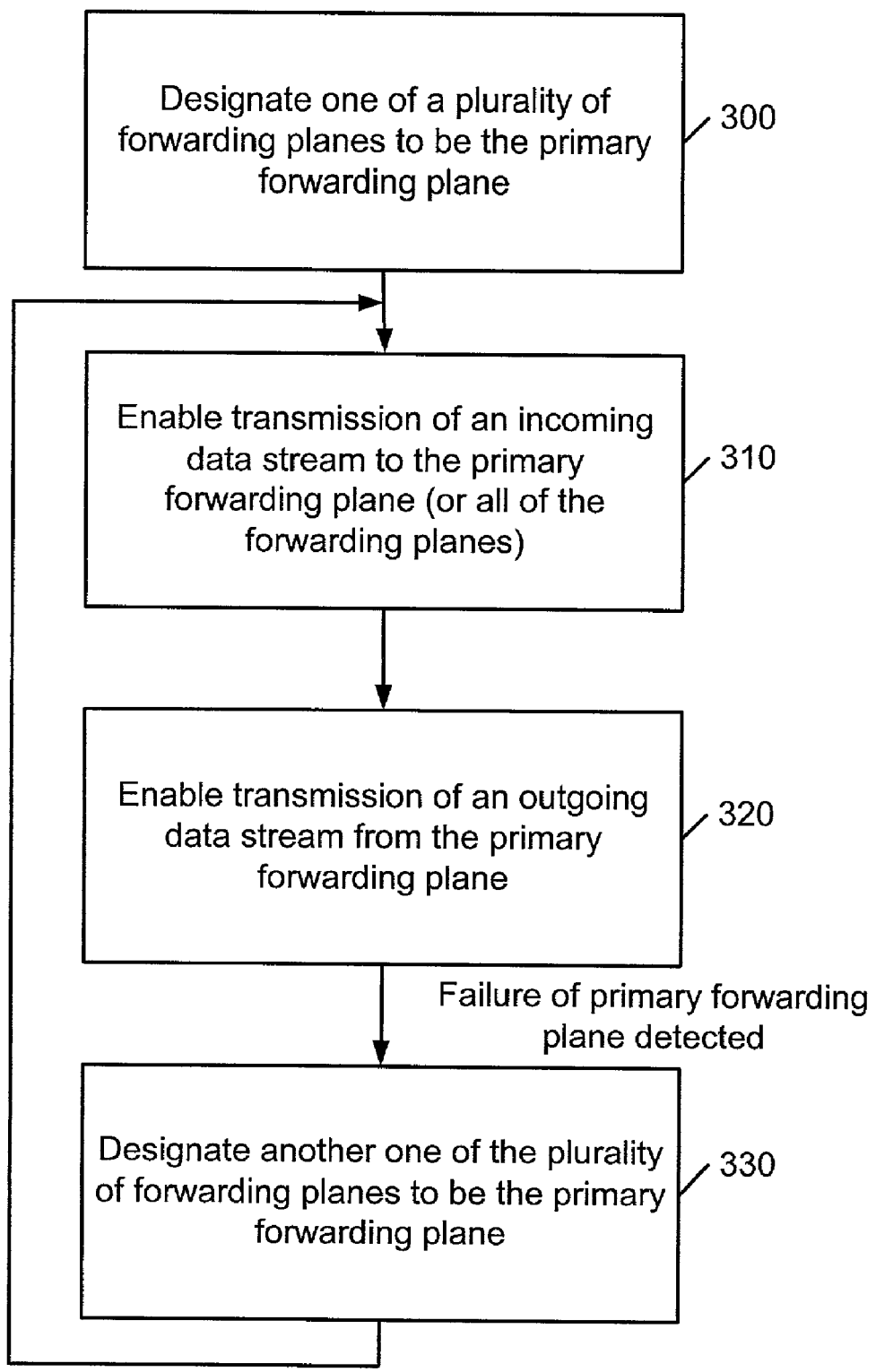
FIG. 3 is a flow chart of a first process incorporating principles of the invention.

The operation of switchover controller 140 is illustrated in the flow chart shown in FIG. 3. Switchover controller 140 designates one of the forwarding planes to be the primary forwarding plane (step 300). This designation may be done by default (e.g., initially always selecting forwarding plane 120A) or after polling the forwarding planes to determine a priority. The forwarding planes that are not designated as the primary forwarding plane may be designated as secondary forwarding planes (as described herein, all non-primary forwarding planes are referred to as secondary forwarding planes, though switchover controller 140 does not have to actually designate those planes as such). When interface module 130 is implemented as shown in FIG. 2A, switchover controller 140 enables transmission of packets received at interface modules 130 to be sent to the designated primary forwarding plane (step 310). When interface module 130 is implemented as shown in FIG. 2B, interface modules 130 send received packets to two or more (or all) of the forwarding planes (step 310). The forwarding plane(s) obtain state information from some or all of the received packets, such as data packets (e.g., packet headers), control packets (e.g., routing engine configuration or control traffic), or both.

Switchover controller 140 enables interface module 130 to transmit an outgoing data stream of packets using packets received from the primary forwarding plane (step 320). By doing so, switchover controller 140 may cause packets received from the secondary forwarding planes to be discarded at interface modules 130. In an alternative embodiment, switchover controller 140 could cause packets from the secondary forwarding planes to be discarded at the secondary forwarding planes before they are received at interface modules 130.

Switchover controller 140 receives signals from one or more of the forwarding planes and determines the status of each forwarding plane. If switchover controller 140 determines that the primary forwarding plane has failed, it designates one of the secondary forwarding planes to be the primary forwarding plane (step 330). In carrying out this step, switchover controller 140 may first check the status of the secondary forwarding plane to ensure that it is operational before designating it to be the primary forwarding plane. Once the primary forwarding plane has been redesignated, switchover controller 140 performs steps 310 and 320 until the newly designated primary forwarding plane fails.

Figure 4:
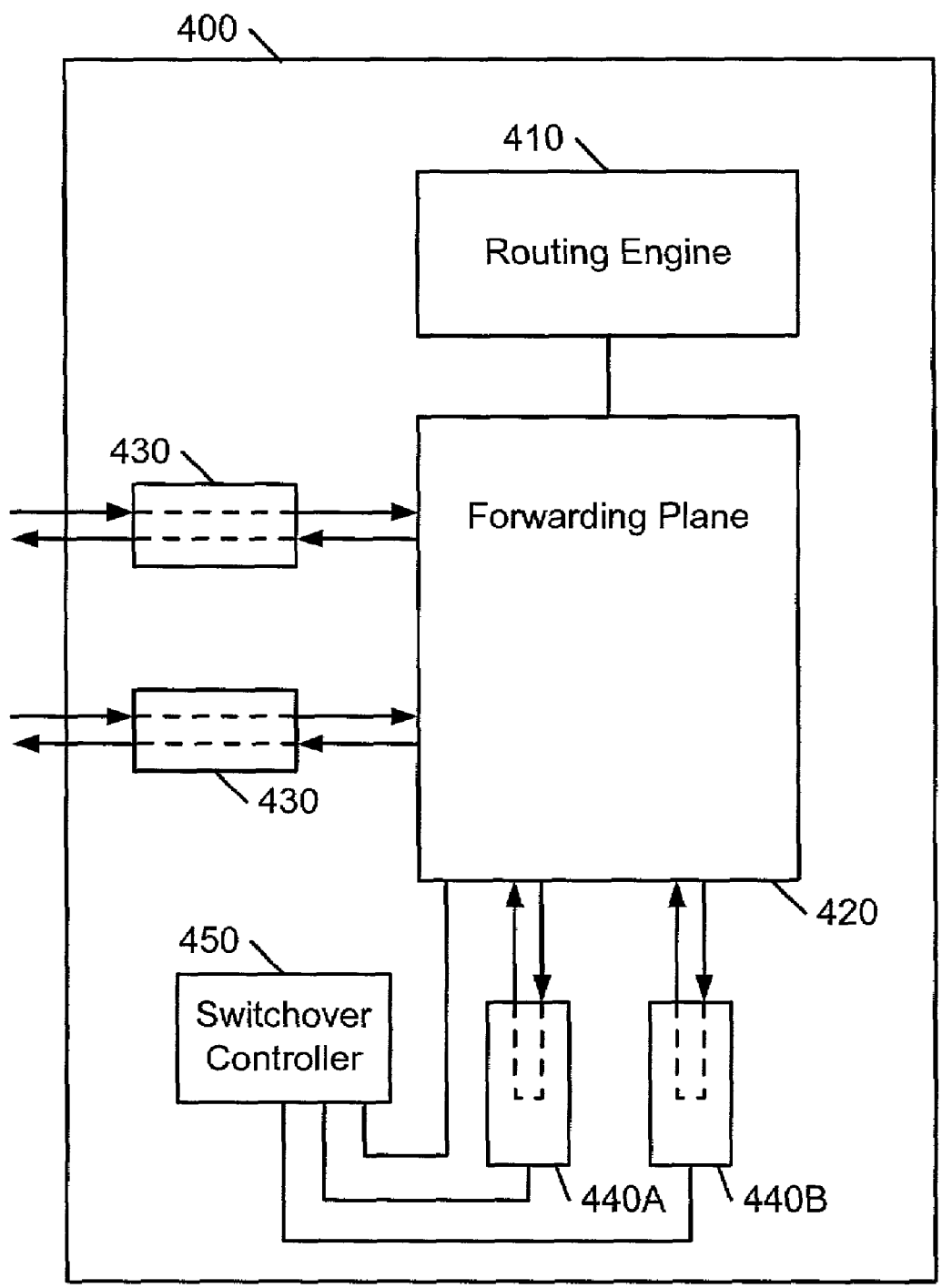
FIG. 4 is a block diagram of a second system incorporating principles of the invention.

While FIGS. 1–3 depict one system that incorporates principles of the invention, other systems can also be configured. FIG. 4 shows another such system, system 400, which incorporates principles of the invention. System 400 includes routing engine 410, forwarding plane 420, interface modules 430, service modules 440A and 440B, and switchover controller 450. Forwarding plane 420 is coupled to routing engine 410, interface modules 430, service modules 440A and 440B, and switchover controller 450. Switchover controller is also coupled to service modules 440A and 440B. Like system 100, system 400 is preferably a network switching device (e.g., a router or switch), which interconnects with other switching devices to form part of a network, and accordingly may include other components used in a network switching device.

Routing engine 410 and forwarding plane 420 are similar to routing engine 110 and one of the forwarding planes 120A and 120B, respectively. Forwarding plane 420 is also configured to duplicate designated packets and transmit them to two or more outputs (or two or more modules coupled to forwarding plane 420). Forwarding plane 420 may, for example, include multicast functionality that permits it to transmit designated packets to multiple destinations. In a preferred embodiment, forwarding plane 420 can transmit certain packets destined for a service module to both service modules 440A and 440B.

Interface modules 430 serve as an external interface for system 400. Interface modules 430 connect to respective external lines and forwarding plane 420 to transmit packets between the external lines and forwarding plane 420. In receiving packets, interface modules 430 preferably perform some processing on the received packets (e.g., layer 2/3 header processing) and then transmit the packets to forwarding plane 420. In transmitting packets, interface modules 430 preferably perform some processing from packets received from forwarding plane 420 and then transmit the packets to the respective lines. In a preferred embodiment, interface modules 430 are equipped to handle characteristics unique to the external lines to which they are connected. For example, if the external lines are fiber optic, interface modules 430 may incorporate optical components, such as lasers, to receive and transmit packets over the fiber optic lines. While two interface modules 430 are shown, fewer or more interface modules 430 may be used. In addition, while each interface module 430 is shown as having a single incoming line and a single outgoing line, interface modules 430 could have more incoming and outgoing lines.

Service modules 440A and 440B are processing modules that connect to forwarding plane 420. Each service module receives packets from forwarding plane 420, processes the received packets in some manner (such as by performing packet encapsulation), and outputs the processed packets back to forwarding plane 420. From the perspective of forwarding plane 420, service modules 440A and 440B may be treated like interface modules 430. Forwarding plane 420 transmits flows of packets to the service modules and receives flows of packets from the service modules. In accordance with the invention, both service modules receive and process the same packets from forwarding plane 420 (so that they can maintain the same state information), though processed packets from only the primary service module are forwarded by forwarding plane 420.

Figure 5:
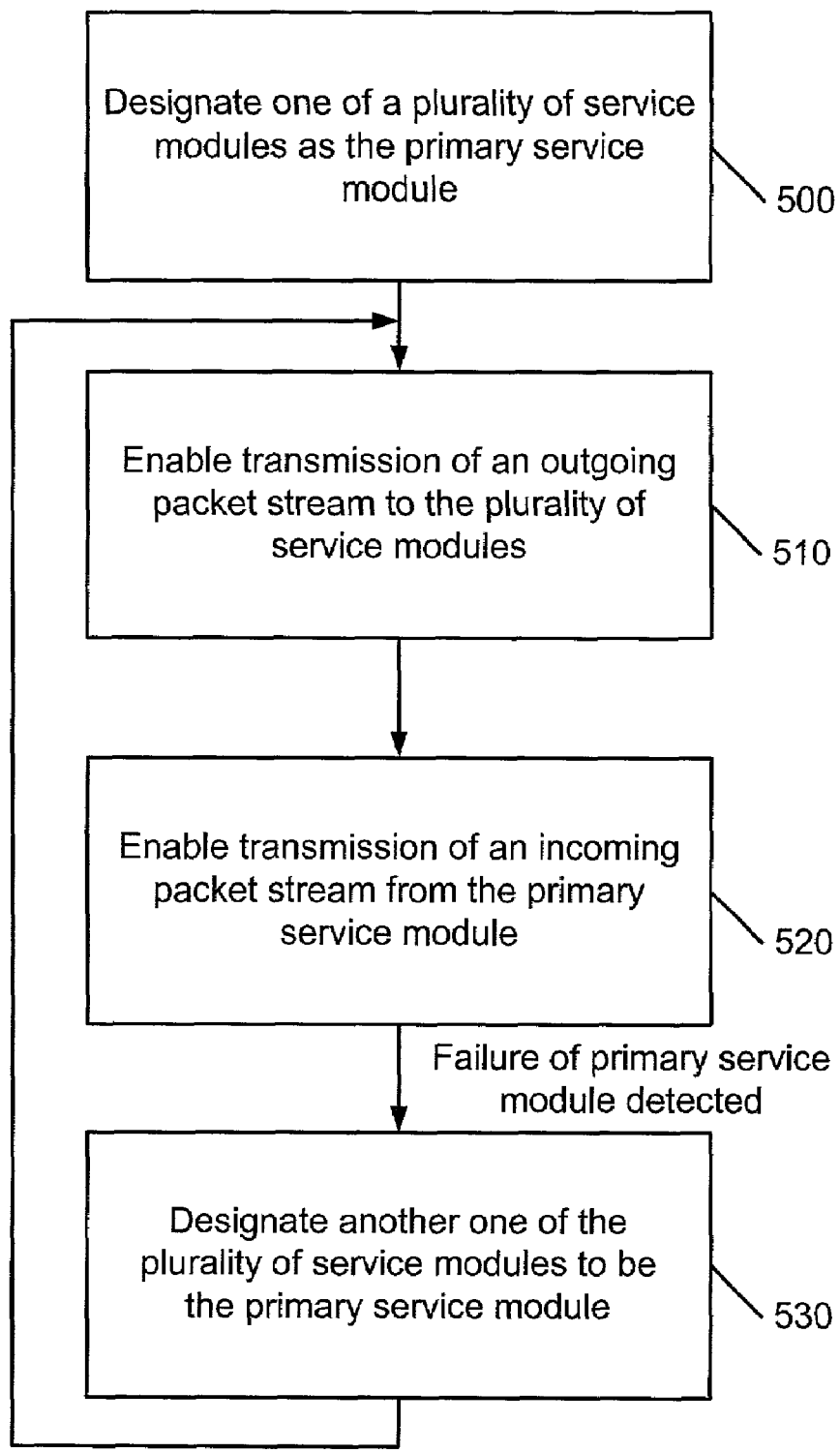
FIG. 5 is a flow chart of a second process incorporating principles of the invention.

Switchover controller 450 controls the manner in which service modules 440A and 44B interact with forwarding plane 420 based on the status of the service modules. Switchover controller 450 may be implemented in hardware, software, or a combination of hardware and software. The operation of switchover controller 450 is illustrated in the flow chart shown in FIG. 5.

Switchover controller 450 designates one of the service modules 440A and 440B to be the primary service module (step 500). This designation may be done by default (e.g., initially always selecting service module 440A) or after polling the service modules to determine a priority. The service modules that are not designated as the primary forwarding plane may be designated as secondary service modules (as described herein, all non-primary service modules are referred to as secondary service modules, though switchover controller 140 does not have to designate those modules as such). Switchover controller 450 enables transmission of packets from forwarding plane 420 to be sent to both of the service modules (step 510). Forwarding plane 420 may employ a multicast mechanism so that the same packets are sent to both service modules. In an alternative embodiment, forwarding plane 420 is configured (by switchover controller 450 or in some other manner, such as manually by a user) to send duplicate packets to both service modules. The service modules obtain state information from some or all of the received packets, such as data packets (e.g., packet headers), control packets (e.g., routing engine configuration or control traffic), or both.

Switchover controller 450 enables packets from the primary service module to be received by forwarding plane 420 for forwarding (step 520). By doing so, switchover controller 450 may cause packets received from the secondary service module to be discarded at the secondary service module or at forwarding plane 420.

Switchover controller 450 receives signals from one or more of the service modules and determines the status of each service module. If switchover controller 450 determines that the primary service module has failed, it designates one of the secondary service modules to be the primary service module (step 530). In carrying out this step, switchover controller 450 may first check the status of the secondary service module to ensure that it is operational before designating it to be the primary service module. Once the primary service module has been redesignated, switchover controller 450 performs steps 510 and 520 until the newly designated primary service module fails.

Other embodiments of the invention will be apparent to those skilled in the art from consideration of the specification and practice of the invention disclosed herein. The invention, for example, may be utilized in any digital system incorporating redundant components whose operation is based on maintained state information. State is maintained in both the primary and secondary components, so that operation can be switched over from the primary to the secondary components without waiting the entire period the secondary component would need to obtain state before it became operational. In the context of a network device, another example of such a component could be a routing engine. Moreover, while state information may be communicated to the primary and secondary components over data traffic, control traffic, or both, state information may also be communicated in other forms and manners. It is intended that the specification and examples be considered as exemplary only, with a true scope and spirit of the invention being indicated by the following claims.

What is claimed is:

1. An interface module usable in a system for forwarding packets, comprising:
    an ingress port for receiving an incoming stream of data packets;
    a switchover unit, when a group of three or more forwarding planes are connectable to the interface module the switchover unit being configured to select two forwarding planes of the group;
    duplicator logic to duplicate the data packets contained in the received incoming stream and transmit the duplicate data packets to the selected two forwarding planes for processing, wherein identical state information is maintained in the selected two forwarding planes based upon state information obtained from the transmitted data packets;
    despray logic to form an outgoing stream of data packets from the processed data packets forwarded form one of the selected two forwarding planes based on a signal from the switchover unit; and an egress port for transmitting the outgoing stream of data packets.

2. The interface module of claim 1, wherein the switchover unit selects the two forwarding planes of the group in response to receipt of a signal indicating the status of one or more of the two forwarding planes.

3. A system for forwarding packets, comprising:
a set of three or more forwarding planes that includes first and second forwarding planes configured to receive data packets from a plurality of interface modules, process the received packets, and forward the processed packets to the plurality of interface modules;
controller to designate the first and second forwarding planes from among the set of three or more forwarding planes, wherein the first and second forwarding planes maintain identical state information based upon state information obtained from the received packets; and
a first one of the interface modules coupled to the first and second forwarding planes and including first logic to duplicate packets contained in an incoming stream at an ingress port and transmit the packets to the first and second forwarding planes for processing, and
second logic to form an outgoing stream of packets from the processed packets forwarded from one of the first or second forwarding planes based on a signal from the controller and transmitting the outgoing stream of packets at an egress port.

4. The system of claim 3, further comprising:
a routing engine, coupled to each of the first and second forwarding planes, for computing route information using routing protocols.

5. The system of claim 4, wherein each of the first and second forwarding planes forwards received packets for transmission based on address information contained in respective packets and route information computed by the routing engine.

6. The system of claim 3, wherein the first interface module selects one of the first or second forwarding planes in response to a signal indicating the status of one or more of the forwarding planes.

7. The system of claim 4, wherein the state information comprises configuration information associated with the routing engine.

8. The system of claim 3, wherein the received packets comprise at least one of data packets or control packets.

9. The system of claim 3 wherein the state information comprises historical state information.

10. A network device, comprising:
three or more packet forwarding engines (PFEs) configured to receive packets from a plurality of interface modules, process the received packets, and forward the processed packets to the plurality of interface modules;
a controller to designate a first one of the PFEs and a second one of PFEs; and
a first one of the interface modules coupled to the first and second PFEs, wherein the first interface module includes first logic to:
receive at least one packet contained in an incoming stream at an ingress port, duplicate the at least one packet, and
transmit the duplicate packet to the first PFE and the second PFE for processing, wherein the first and second PFEs maintain identical state information associated with the processed packet, and
second logic to:
transmit, at an egress port of the network device, the processed packet forwarded from one of the first PFE or the second PFE based on a signal from the controller.

11. The system of claim 10, further comprising:
a routing engine coupled to each of the first and second PFEs, the routing engine to compute route information using routing protocols.

12. The system of claim 11, wherein each of the first and second PFEs is configured to forward received packets for transmission based on address information contained in respective packets and route information computed by the routing engine.

13. The system of claim 11, wherein the state information comprises configuration information associated with the routing engine.

14. The system of claim 10, wherein the controller designates one of the first or second PFEs in response to a signal indicating the status of one or more of the PFEs.

15. The system of claim 10, wherein the received packets comprise at least one of data packets or control packets.

16. The apparatus of claim 10, wherein the state information comprises historical state information.

17. In a network device including a group of three or more packet forwarding engines (PFEs) configured to receive packets from and transmit packets to at least one of a plurality of interface modules coupled to the group of PFEs, a method comprising:
selecting a first PFE and a second PFE of the group of PFEs;
receiving, by the at least one interface module, at least one packet contained in an incoming stream at an ingress port of the network device;
duplicating the at least one packet;
transmitting, from the at least one interface module, the duplicate packet to the first PFE and the second PFE for processing; maintaining, in the first and second PFEs, identical state information associated with the processed packet;
receiving, at the at least one interface module, the processed packets forwarded from each of the first and second PFEs;
despraying the received packets to form an outgoing stream of data packets based on a signal received from a control unit of the network device; and
transmitting, by the at least one interface module, the outgoing stream of data packets at an egress port of the network device.

18. The method of claim 17, wherein the network device further includes a routing engine coupled to each of the first and second PFEs, the method further comprising:
computing route information using routing protocols.
transmit, at an egress port of the network device, processed packet forwarded from one of the first PFE or the second PFE based on a signal from the controller.

19. The method of claim 18, wherein each of the first and second PFEs forwards received packets for transmission based on address information contained in respective packets and route information computed by the routing engine.

20. The method of claim 17, wherein the first interface module selects the first and second PFEs in response to a signal indicating a status of one or more PFE of the group.

21. A network device including a set of three or more packet forwarding engines (PFEs) configured to receive packets from and transmit packets to at least one of a plurality of interface modules coupled to the first and second PFEs, the network device comprising:

- means for selecting a first PFE of the set of PFEs and a second PFE of the set of PFEs;
- means for receiving, by the at least one interface module, at least one packet contained in an incoming stream at an ingress port of the network device;
- means for duplicating the at least one packet;
- means for transmitting the duplicate packet to the first PFE and the second PFE for processing;
- means for maintaining, in the first and second PFEs, identical state information associated with the processed packet;
- means for receiving, at the at least one interface module, the processed packet forwarded from at least one of the first PFE or the second PFE; and
- means for despraying, by the at least one interface module, the forwarded packet from one of the first PFE or the second PFE, based on a signal from the means for selecting, to form a stream of data packets output at an egress port of the network device.

* * * * *

UNITED STATES PATENT AND TRADEMARK OFFICE
CERTIFICATE OF CORRECTION

PATENT NO. : 7,382,724 B1 Page 1 of 1
APPLICATION NO. : 09/990077
DATED : June 3, 2008
INVENTOR(S) : Hsien-Chung Woo It is certified that error appears in the above-identified patent and that said Letters Patent is hereby corrected as shown below:

Claim 1, column 6 line 67, "form" should be changed to --from--.

Claim 11, column 8 line 6, "system" should be changed to --network device--.

Claim 12, column 8 line 10, "system" should be changed to --network device--.

Claim 13, column 8 line 15, "system" should be changed to --network device--.

Claim 14, column 8 line 18, "system" should be changed to --network device--.

Claim 15, column 8 line 22, "system" should be changed to --network device--.

Claim 16, column 8 line 24, "apparatus" should be changed to --network device--.

Claim 18, column 8 lines 56-58, "transmit, at an egress port of the network device, processed packet forwarded from one of the first PFE or the second PFE based on a signal from the controller" should be deleted.

Signed and Sealed this

Fifth Day of August, 2008

JON W. DUDAS
*Director of the United States Patent and Trademark Office*